US010987973B2

(12) United States Patent
Turner

(10) Patent No.: US 10,987,973 B2
(45) Date of Patent: Apr. 27, 2021

(54) SAFETY RESTRAINT FOR BREAK-AWAY WHEEL ASSEMBLIES

(71) Applicant: William Turner, Yukon, OK (US)

(72) Inventor: William Turner, Yukon, OK (US)

( * ) Notice: Subject to any disclaimer, the term of this patent is extended or adjusted under 35 U.S.C. 154(b) by 127 days.

(21) Appl. No.: 16/432,432

(22) Filed: Jun. 5, 2019

(65) Prior Publication Data

US 2020/0384805 A1 Dec. 10, 2020

(51) Int. Cl.

| | |
|---|---|
| ***B60B 35/08*** | (2006.01) |
| ***B60B 35/04*** | (2006.01) |
| ***B60B 19/00*** | (2006.01) |
| *B60B 7/00* | (2006.01) |

(52) U.S. Cl.

CPC .............. *B60B 35/08* (2013.01); *B60B 19/00* (2013.01); *B60B 35/04* (2013.01); *B60B 7/0013* (2013.01); *B60B 2320/10* (2013.01); *B60B 2900/331* (2013.01)

(58) Field of Classification Search

CPC ......... B60B 35/08; B60B 35/04; B60B 19/00; B60B 2320/10; B60B 7/0013; B60B 2900/331; B60B 37/10

See application file for complete search history.

(56) References Cited

U.S. PATENT DOCUMENTS

| | | | |
|---|---|---|---|
| 3,486,797 A | 12/1969 | Osborne | |
| 3,944,285 A | 3/1976 | Vincent | |
| 5,560,687 A | 10/1996 | Hagelthorn | |
| 5,795,037 A | 8/1998 | Hagelthorn | |
| 5,954,151 A | 9/1999 | Cocharane et al. | |
| 6,070,893 A | 6/2000 | Thorndyke et al. | |
| 7,000,995 B2 | 2/2006 | Hagelthorn | |
| 7,228,932 B2 | 6/2007 | Rosenthal et al. | |
| 7,547,077 B2 | 6/2009 | Melberg et al. | |
| 9,970,486 B2 | 5/2018 | Hagelthorn | |
| 2003/0015909 A1 | 1/2003 | Meek, Jr. | |
| 2013/0213764 A1* | 8/2013 | Lawless ................ | B60B 33/001 198/300 |

OTHER PUBLICATIONS

Park, Jim; "Why do wheels come off trucks?", Oct. 7, 2013; retrieved Dec. 19, 2018 from https://www.truckinginfo.com.

Crosby Group LLC; "Angular Contact Bearing Swivels"; 2017.

Esco Corp.; "Rigging Products Specifications"; document P7000RIG01L0112.

Hanes Supply Inc.; "Section 3: Wire Rope Assembly and Fittings", pp. 3-A, et seq.

Hendrickson; "Technical Procedure: Trailer suspension systems standard wheel service wheel-end"; Mar. 2018, document LIT No. L496, Revision 1.

(Continued)

*Primary Examiner* — Karen Beck

(74) *Attorney, Agent, or Firm* — Robert H. Frantz

(57) ABSTRACT

A semi-trailer wheel restraint system having a bearing swivel and one or more cable sections and hub cab attachments for receipt into and through a hollow core of the trailer's axle. During a wheel bearing failure, the wheel restraint system keeps the loose wheel assembly near the end of the axle by anchoring it to the opposite-end's hub cap, thereby preventing a run-away wheel assembly and providing an operator of the truck an opportunity to safely stop the rig.

16 Claims, 5 Drawing Sheets

305 305' 304' 303 302 304 704 500 201 202 703 701 703' 201' 302 303 304' 304 500 704' 300 300 708 707 500 301' 301 306 304 304' 200 305 305' 305' 305

(56) References Cited

OTHER PUBLICATIONS

Park, Jim; "Keeping your wheesl on", Oct. 15, 2013, retrieved Dec. 19, 2018 from https://www.truckinginfo.com.
Monster, R. F.; "Wheel separations from commercial vehicles: Experiences in Ontario", 2004; Proceedings of the Canadian Multidisciplinary Road Safety Conference XIV.
National Transportation Safety Board; "Safety Recommendation", Oct. 23, 1992; retrieved from https://www.ntsb.gov/safety/safety-recs/recletters/H92_98_101.pdf.
PWB Anchor; "Product Catalogue—2014 Edition".
VIS Automation Service; "Squirrel Wheel Safety Device"; retrieved Dec. 26, 2018 from http://demarytruck.com/tire-squirrel/.
The Cable Connection; "Wire Rope Assemblies and Fittings", 2009.

* cited by examiner

SAFETY RESTRAINT FOR BREAK-AWAY WHEEL ASSEMBLIES

FIELD OF THE INVENTION

The invention generally relates technologies to prevent run-away wheel assemblies after a mechanical failure such as a wheel bearing failure on an over-the-road trailer.

BACKGROUND OF INVENTION

For the purposes of this disclosure, the term "hollow trailer axle" shall refer to any of a variety of axles employed on a variety of towed trailers, such as over-the-road semi-trailers, tractor trailers, and the like, as well as any other axle for a vehicle which is hollow through its core.

FIG. 2 (not shown to scale) provides a functional, lengthwise cut-away view of a generalized hollow trailer axle (200), which generally comprises of a larger diameter center portion (202-202'), with a smaller diameter hub portion (201, 201') at either end. The hub portions and center portion are generally constructed of sections of high-strength round metal tubes, such that the core of the axle from end to end is hollow. The transition between the hubs and the center portion may include several steps, flares, and increments in order to receive and axially-orient the components of the brake and wheel assemblies. The hubs themselves may be parallel (straight) (as shown) or tapered. Hubs are typically provided with threads on the outside surface for receiving one or more spindle nuts.

FIG. 3 (not shown to scale) illustrates an exploded view of a generalize set of components which are received onto a hub (201), aligned on the center (300) of the axle. Generally speaking, an inner bearing group of components (301') is received onto the spindle (201), which might include an inner bearing and a hub seal. Then, a brake system (302) and a hub with lugs (303) are received onto the spindle (201). These may include an air disc brake (ADB) hub and rotor assembly, a standard service conventional hub without a brake system, a cast spoke hub without a brake system, etc. Next, an outer bearing (301) is received onto the spindle (201), and secured by a spindle nut system (306). A spindle nut system may include an inner adjusting nut with lock washer, set screw, star lock washer, and an outer jam nut; a castle nut washer with castle nut and cotter key; or a one-piece spindle nut such as a Stemco™ PRO-TORQ™ nut with a retainer ring.

After the spindle nut system is installed, a hub cap gasket and a hub cap (307) are installed to cover and protect the greased bearings, and to close the end of the hollow spindle (201) to the outside environment. The hub cap is typically secured by a series of small bolts around the periphery of a mounting ring formed in the hub cap. Optionally, if the hub cap is provided with a hubcap oil fill port, a dust cap (308) is secured to the hub cap using a set of bolts, yielding an assembled hub assembly.

Subsequently, the wheel(s) (304, 304') with tires (305, 305') are passed over (around) the hub cap and dust cover to align mounting holes in the wheel(s) with the lug bolts on the hub (303), receiving the lug bolts through the wheel mounting holes. Lug nuts (500) are threaded onto the lug bolts, tightened to torque levels appropriate for the particular wheel, trailer, and load range, to yield a mounted wheel assembly, as shown in FIG. 4.

While the lug bolts, lug nuts, and their current torque levels are readily inspected by a truck driver or repair technician, the state of the bearings is not without disassembly of these components. The inner bearings are essentially impossible to inspect without disassembly, which is a time consuming task. And, the re-assembly may lead to errors which were not originally present prior to the inspection effort.

When a wheel bearing (301, 301') fails, the components of the assembly shift off center (300), and it generally causes enough torque, heat and abrasion that the spindle nut system fails, so the wheels and tires (304, 304', 305, 305') with the still-attached hub (303) and brake system (302), as shown in FIG. 6, fly free of the axle assembly as a sub-assembly (600), often at a high rate of speed (601), as shown in FIG. 5. Combining the speed (601) with the weight of the break-away sub-assembly (600), which can weigh as much as 700 pounds, a very dangerous projectile is now loose and out of control. It can travel a great distance before stopping, causing considerably property damage, as well as injury and death to people and livestock.

FIGS. 2-5 are for general reference only, and represent the functional components of a typical trailer axle, hub and wheel system. In actual products, numbers of components, sizes, order of assembly, and names may vary to some degree, while still being represented by the generalizations of these figures.

SUMMARY DISCLOSURE OF THE INVENTION

A plurality of exemplary embodiments are described for a semi-trailer wheel restraint system having a bearing swivel and one or more cable sections and hub cab attachments for receipt into and through a hollow core of the trailer's axle. During a wheel bearing failure, the wheel restraint system keeps the loose wheel assembly near the end of the axle by anchoring it to the opposite-end's hub cap, thereby preventing a run-away wheel assembly and providing an operator of the truck an opportunity to safely stop the rig.

BRIEF DESCRIPTION OF THE DRAWINGS

The description set forth herein is illustrated by the several drawings, which are not necessarily drawn to mechanical scale.

DETAILED DESCRIPTION OF EMBODIMENT(S) OF THE INVENTION

The inventor of the present invention has recognized a problem in the art not previously recognized or addressed regarding prevention of run-away, break-away or fly-away semi-trailer wheels. Some of these failures are due to lug nut over-torquing and/or lug bolt stress and wear. To the degree that these elements can be readily visually inspected by a technician without significant disassembly and re-assembly, these failures can be minimized by enhanced maintenance practices. However, the present inventor has recognized that the other run-away, break-away or fly-away semi-trailer wheels which due to bearing failures are much more difficult to prevent, and that existing technologies on the market are insufficient and/or ineffective for a number of reasons. Therefore, the following structures are disclosed which are exemplary of the invention which is inexpensive, effective, and readily installed on existing hollow axle assemblies. While certain components and certain dimensions and specifications may be disclosed, it will be recognized by those skilled in the art that certain substitutions may be made without departing from the spirit and scope of the present invention.

Figure 6:
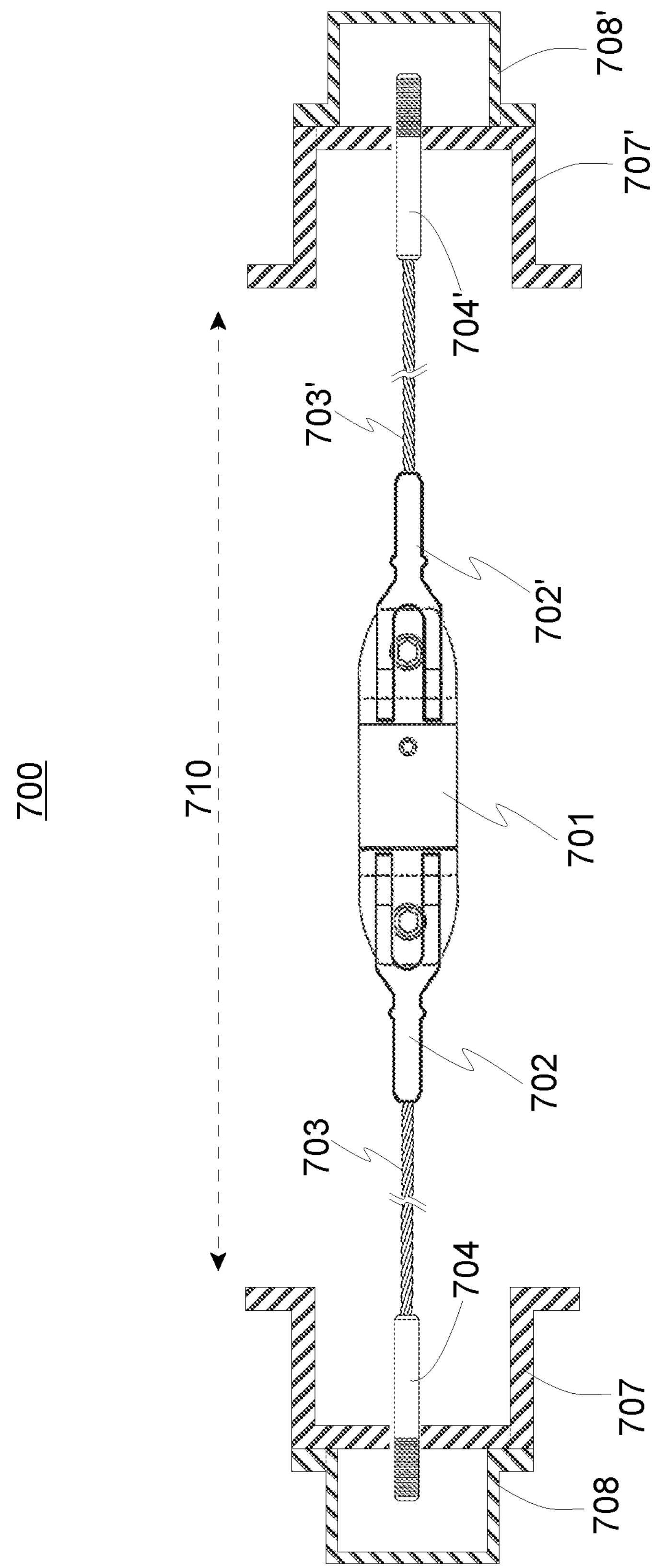
FIG. 6 sets forth an exemplary embodiment of a wheel retainer system according to the present invention.

Turning to FIG. 6, a new assembly for a wheel restraint (700) is shown. It includes at least one new hub cap (708) (retainer bolts not shown for clarity of the drawing), an optional new or standard dust cap (707) (retainer bolts not shown for clarity of the drawing). The new hub cap (708) preferably has a hole formed in the center of it to receive an attachment end, such as a threaded bolt, of a restraint cable assembly (outer-end retention nut(s) not shown for clarity of the drawing). Attached to an inner end of the attachment end is a length of wire rope (703), a connector (702), and an inline bearing swivel (701). On the opposite end of the swivel (702) is preferably a similar series of components (702', 703', 704', 708', and various nuts, pins, etc., not shown for drawing clarity).

For a typical semi-trailer, a particular embodiment might be specified for a 5,000 pound steady load (during wheel bearing failure), with a 25,000 pound surge, so one might utilize Style TTS threaded studs (available from Hanes Supply, Inc., of Buffalo N.Y.), two lengths of ½" 7×7 stainless steel wire rope (type 302/304, available from The Cable Connection™ of Carson, Nev.), a bullet-style bearing swivel having less than 4" outer diameter (available from The Crosby Group LLC of Tulsa, Okla.), and two stainless steel connectors to attach the wire rope to the swivel in an appropriate manner (Holerite™ sockets available from ESCO Corporation of Portland, Oreg.). The overall length (710) of the retainer system (700) should be sized to match the length of the intended axle for protection. The cable connections can be swaged or swageless, and the cable can be replaced with other suitable, flexible components, such as but not limited to lengths of chain. Parts of the assembly may be coated in a plastic to protect the components from metal-to-metal impacts, and from exposure to grease, oil, etc.

Figure 1:
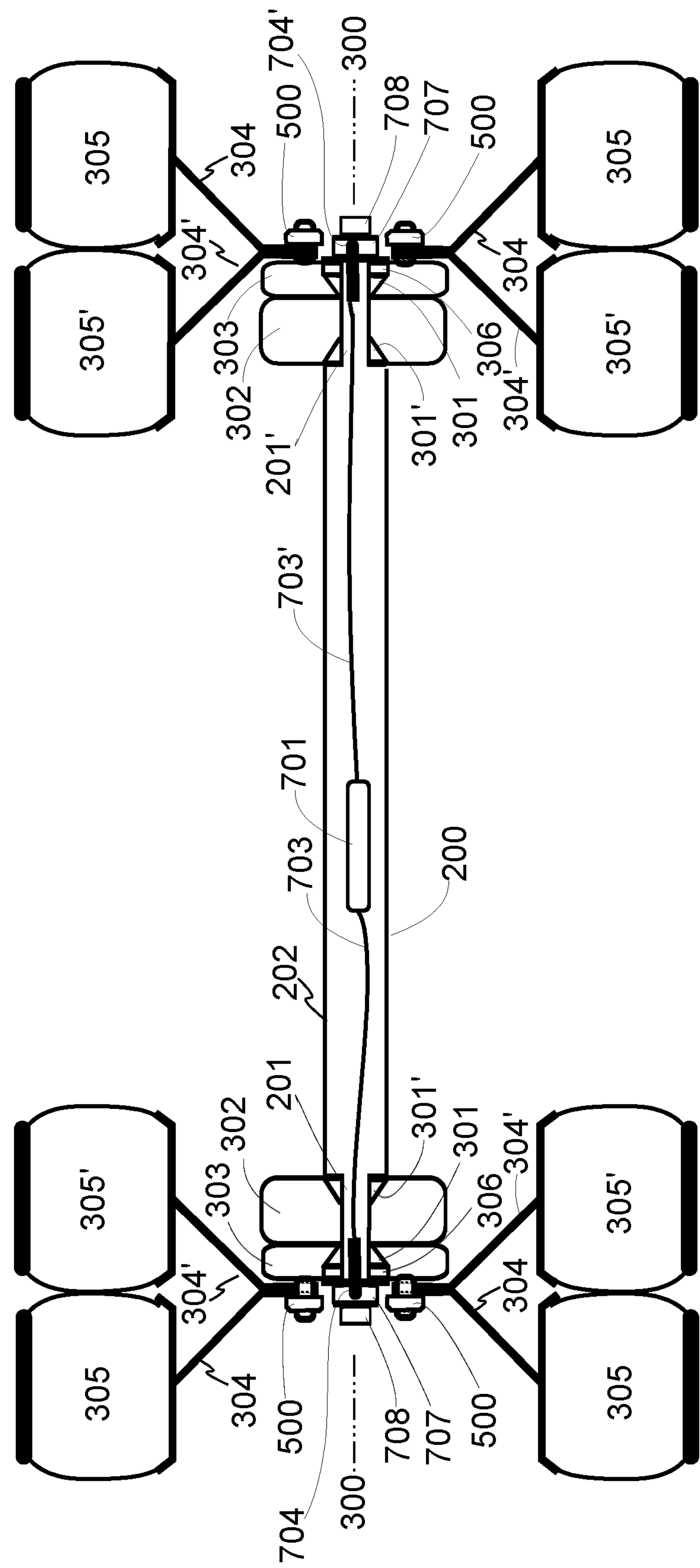
FIG. 1 illustrates an embodiment according to the present invention of a wheel restraint system installed into a hollow axle of a typical semi-trailer.
Figure 2:
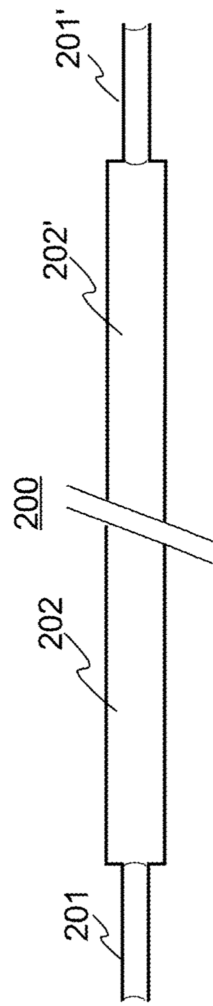
FIG. 2 shows a lengthwise cut-away view of a generalized hollow semi-trailer axle for reference understanding the disclosed embodiments of the present invention.
Figure 3:
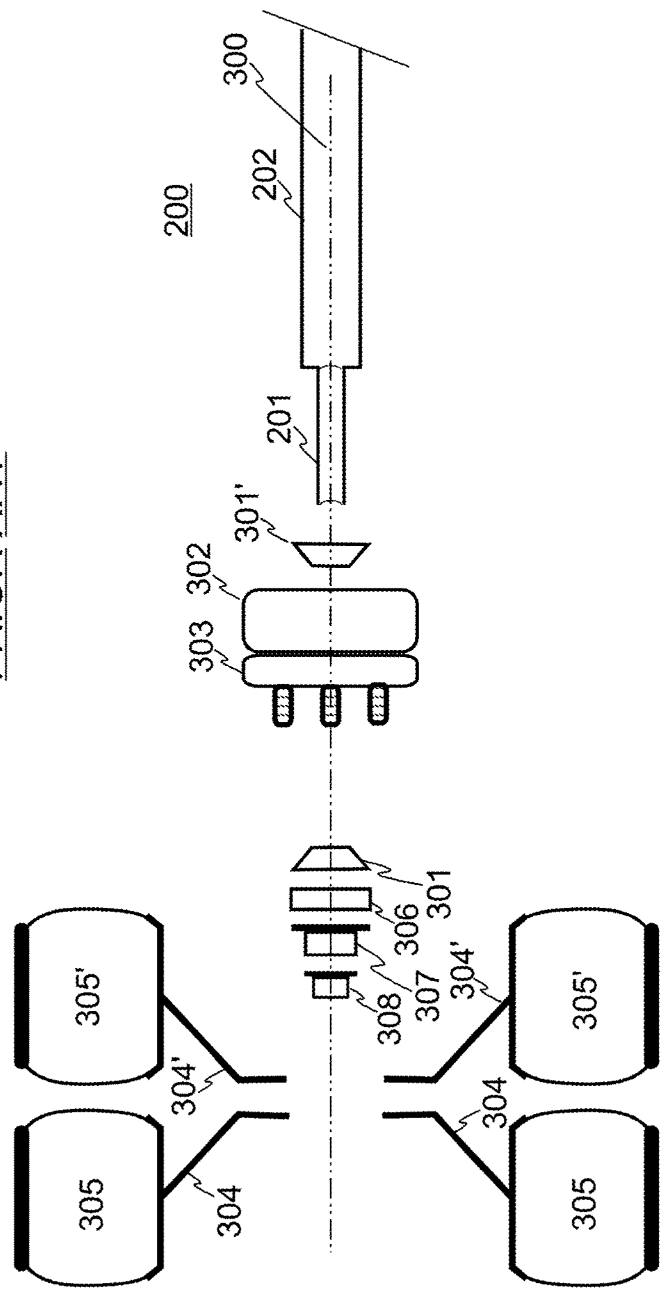
FIG. 3 illustrates a plurality of generalized axle and wheel system components and sub-assemblies of a typical hollow semi-trailer axle for reference understanding the disclosed embodiments of the present invention.
Figure 4:
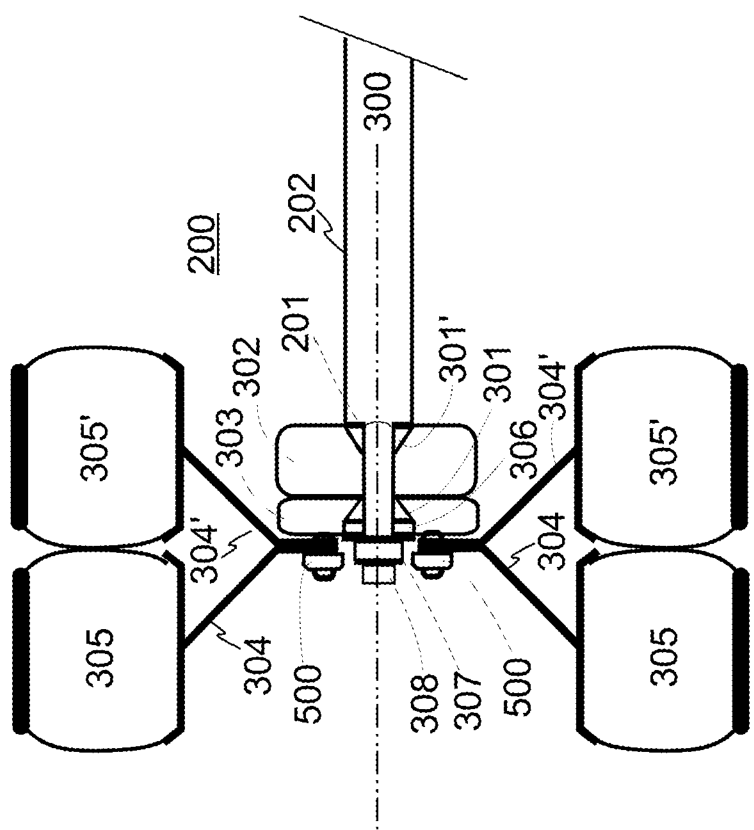
FIG. 4 shows the components of FIG. 3 in an assembled and mounted configuration.
Figure 5:
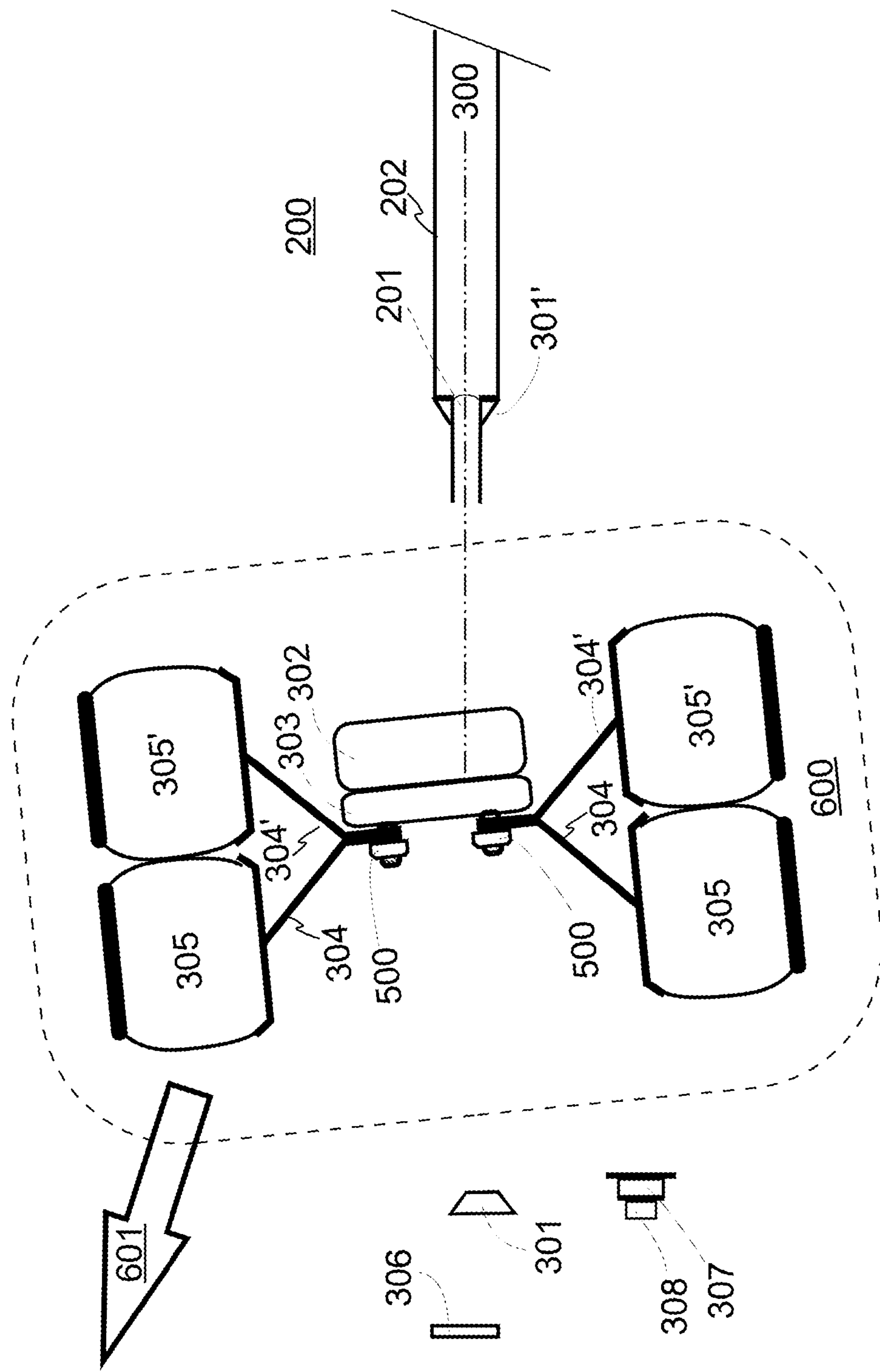
FIG. 5 depicts a typical failure mode following wheel bearing failure for reference understanding the disclosed embodiments of the present invention.

Referring now to FIG. 1, the wheel restraint system (700) can be installed on a hollow axle without removing the wheels, without removing the load in the trailer, and conveniently in a truck lot without requiring a mechanic's garage. The existing dust covers and hub caps on both wheels at opposite ends of the axle are removed, such as by removing a plurality of fastening bolts through a peripheral flange. After the open ends of the hollow axle are exposed, one threaded bolt on a first end (704') can be fished into and through the hollow core of the axle until it reaches the opposite end of the axle. This can be done many ways, such as by taping the first end to a rod which is greater than the length of the axle, and then pushing the rod into and through the hollow core, pulling the taped end (704'), cables and swivel into the hollow core with it.

At the opposite end, the threaded bolt can be affixed to the new hub cap (707) by passing the threaded bolt through the hole in the new hub cap (707), and securing it, such as with one or more washers, nuts, pins, retainer clips, etc. Now, the second end with the second threaded bold (704) remains at the originating end of the axle. A second new hub cap (707) is attached to the second end (704), such as with one or more washers, nuts, pins, retainer clips, etc., keeping tension in the wheel restraint system light for now. The two new hub caps (707) can now be fastened to the hub assembly, such as by re-installing a plurality of bolts, and torqued to specifications. The entire wheel restrain system (700) is now encased within the hollow core axle and spindles, except for the tips of the threaded studs (704, 704') and fasteners exposed outside the new hub caps (707).

Now, in a preferred embodiment, tension is applied to the wheel restrain system (700) by pulling on the exposed tips of the threaded studs, and tightening the fasteners to take up the slack. The pulling tension can be applied in a number of manners, such as by using a threaded tool to engage the bolts and provide for a manual pull handle, or by holding the tip of the threaded stud steady while rotating the fastening nut with a wrench. It should be noted that the tension being applied is merely for taking out the slack in the retainer system, but the tension is not necessarily great enough to retain the wheels during a wheel bearing failure. Finally, the optional dust caps (708) are installed on both wheels, and installation is complete in just a few minutes.

During a wheel bearing failure, the movement (601) of the loose wheel assembly (600) will be restricted to stay near the end of the axle, thereby preventing the loose wheel assembly (600) from flying free from the moving truck. This failed wheel will now likely cause sparks, smoke and/or vibration which will be noticeable by the driver and/or passersby, allowing the driver to bring the rig to a safe stop, keeping the loose wheel assembly with or nearby the end of the axle.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A wheel restraint system comprising:

a first attachment device for affixing to a first hub cap of a first end of an axle and a first wheel assembly;

a second attachment device for affixing to a second hub cap of a second end of the axle and a second wheel assembly;

at least one inline swivel, having an exterior dimension less than an interior dimension of a hollow core of the axle;

a first section of flexible retainer extending from the first attachment device to a first end of the inline swivel, for reception into the hollow core of the axle; and a second section of flexible retainer extending from the second attachment device to a second end of the inline swivel, for reception into the hollow core of the axle.

2. The wheel restraint system as set forth in claim 1 wherein the first attachment device comprises a threaded stud.

3. The wheel restraint system as set forth in claim 1 wherein the second attachment device comprises a threaded stud.

4. The wheel restraint system as set forth in claim 1 wherein the first section of flexible retainer comprises a section of wire rope.

5. The wheel restraint system as set forth in claim 1 wherein the second section of flexible retainer comprises a section of wire rope.

6. The wheel restraint system as set forth in claim 1 wherein the first section of flexible retainer comprises a section of chain.

7. The wheel restraint system as set forth in claim 1 wherein the second section of flexible retainer comprises a section of chain.

8. The wheel restraint system as set forth in claim 1 wherein the inline swivel comprises a bullet-style bearing swivel.

9. A method of manufacture a wheel restraint system comprising:

assembling a first section of flexible retainer to extend from a first attachment device to a first end of an inline swivel for reception into the hollow core of an axle, wherein the first attachment device is configured to affix to a first hub cap of a first end of an axle proximal to a first wheel assembly; and assembling a second section of flexible retainer extending from a second attachment device to a second end of the inline swivel, wherein the second attachment device is configured to affix to a second hub cap of a second end of the axle proximal to a second wheel assembly;

wherein the inline swivel has an exterior dimension less than an interior dimension of a hollow core of the axle.

10. The method of manufacture as set forth in claim 9 wherein the first attachment device comprises a threaded stud.

11. The method of manufacture as set forth in claim 9 wherein the second attachment device comprises a threaded stud.

12. The method of manufacture as set forth in claim 9 wherein the first section of flexible retainer comprises a section of wire rope.

13. The method of manufacture as set forth in claim 9 wherein the second section of flexible retainer comprises a section of wire rope.

14. The method of manufacture as set forth in claim 9 wherein the first section of flexible retainer comprises a section of chain.

15. The method of manufacture as set forth in claim 9 wherein the second section of flexible retainer comprises a section of chain.

16. The method of manufacture as set forth in claim 9 wherein the inline swivel comprises a bullet-style bearing swivel.

* * * * *